United States Patent [19]

Horton

[11] 4,212,329

[45] Jul. 15, 1980

[54] PIPE CONSTRUCTION AND METHOD OF MAKING SAME

[75] Inventor: Edward E. Horton, Portuguese Bend, Calif.

[73] Assignee: Deep Oil Technology, Inc., Irvine, Calif.

[21] Appl. No.: 933,440

[22] Filed: Aug. 14, 1978

[51] Int. Cl.² .............................................. F16L 9/22
[52] U.S. Cl. ..................................... 138/155; 138/158
[58] Field of Search ............... 138/155, 120, 157, 158, 138/177; 285/163; 9/8 P

[56] References Cited

U.S. PATENT DOCUMENTS

| | | | |
|---|---|---|---|
| 1,185,459 | 5/1916 | Worley | 285/163 |
| 2,136,770 | 11/1938 | Witzenmann | 285/163 |
| 2,355,336 | 8/1944 | Shafer | 138/155 |
| 3,162,214 | 12/1964 | Bazinet | 285/163 |
| 3,921,558 | 11/1975 | Redshaw | 9/8 P |
| 3,941,160 | 3/1976 | Campbell | 138/155 |
| 4,116,009 | 9/1978 | Daubin | 138/148 |

*Primary Examiner*—Lenard A. Footland
*Attorney, Agent, or Firm*—Poms, Smith, Lande & Rose

[57] ABSTRACT

A pipe construction for utilizing ocean energy including a plurality of toroidal pipe elements stacked one upon the other in coaxial relation to form a cylindrical wall of substantial diameter and length. Sealing means are provided between pipe elements to make leakproof the cylindrical wall, said pipe structure being suspended by a plurality of tension members arranged about the inner circumference of the cylindrical wall. A pipe construction having a circular or a polygonal cross sectional shape and having portions thereof of selected physical characteristics for selected depth of water.

13 Claims, 12 Drawing Figures

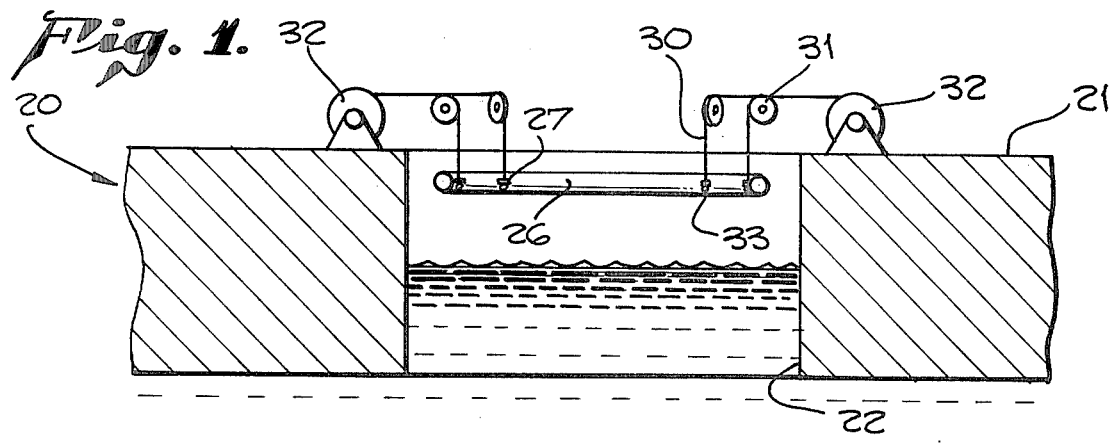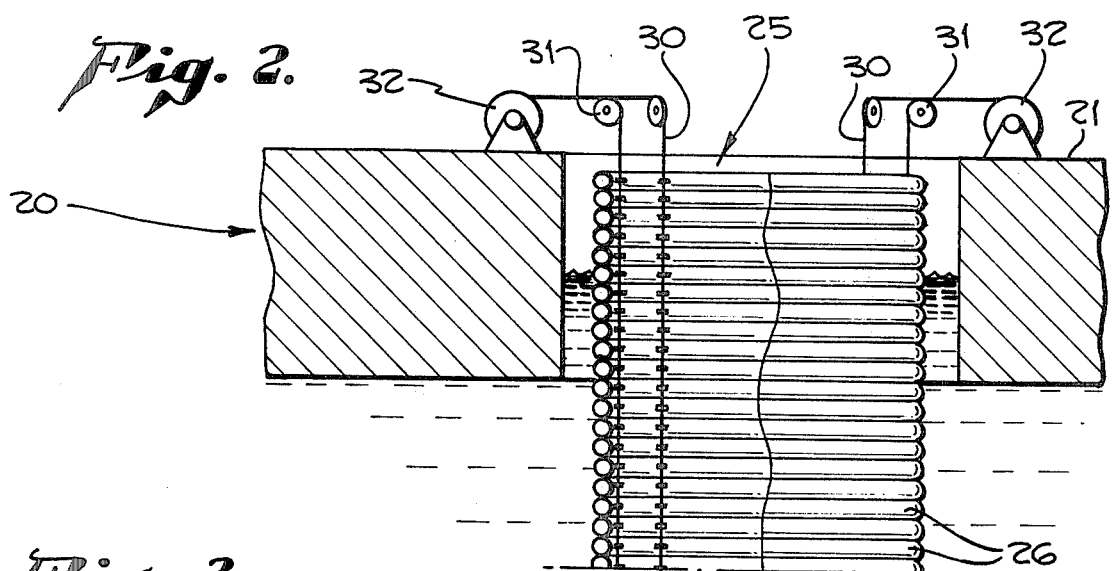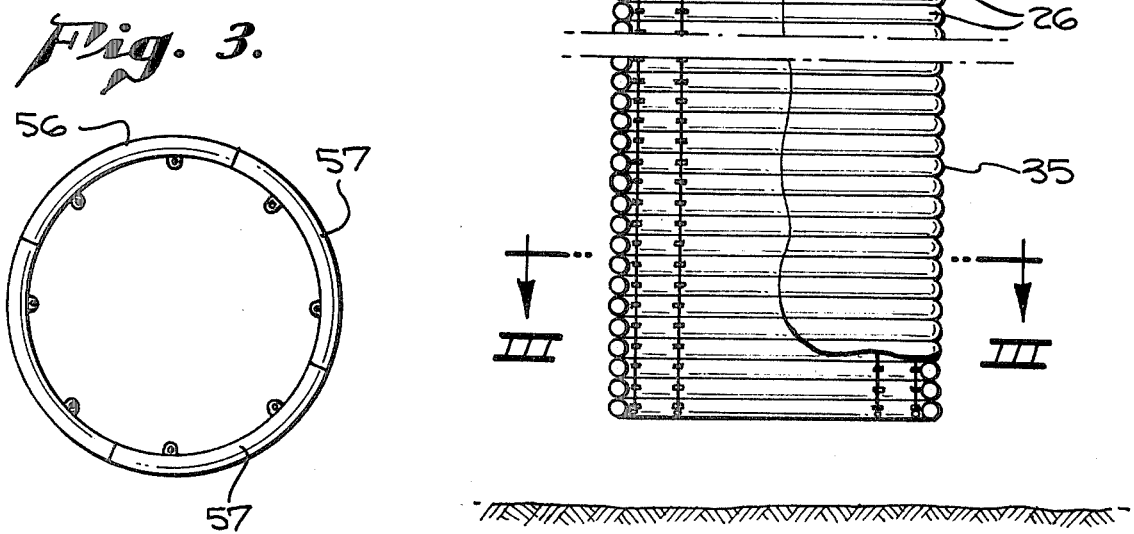

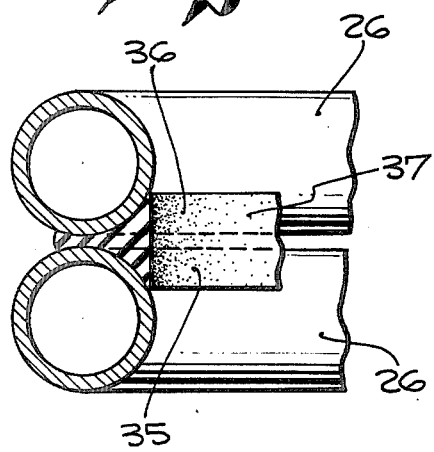
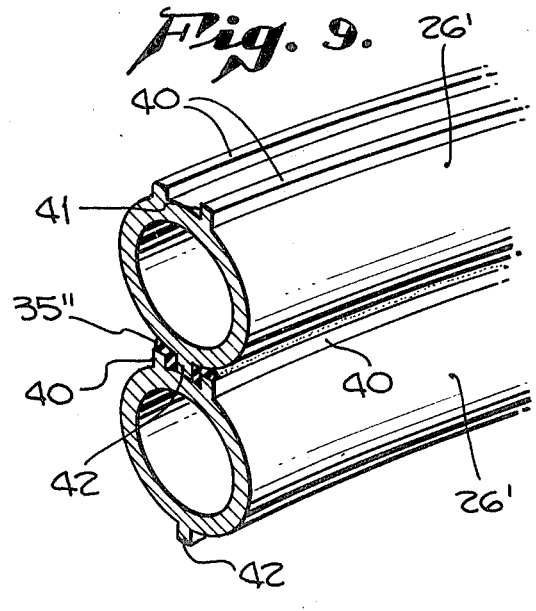
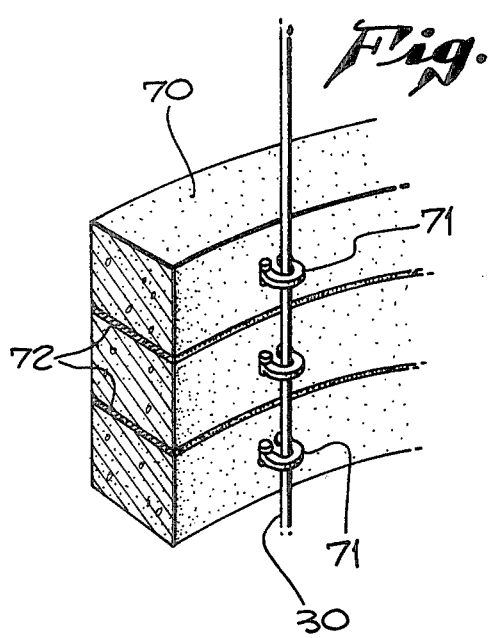
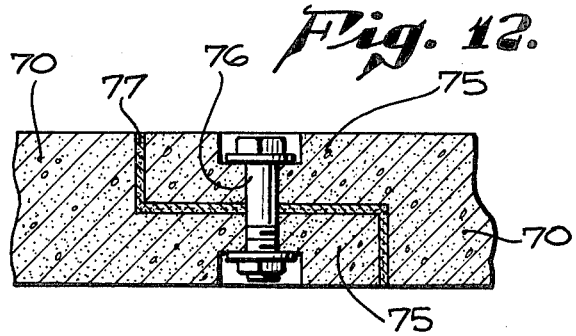
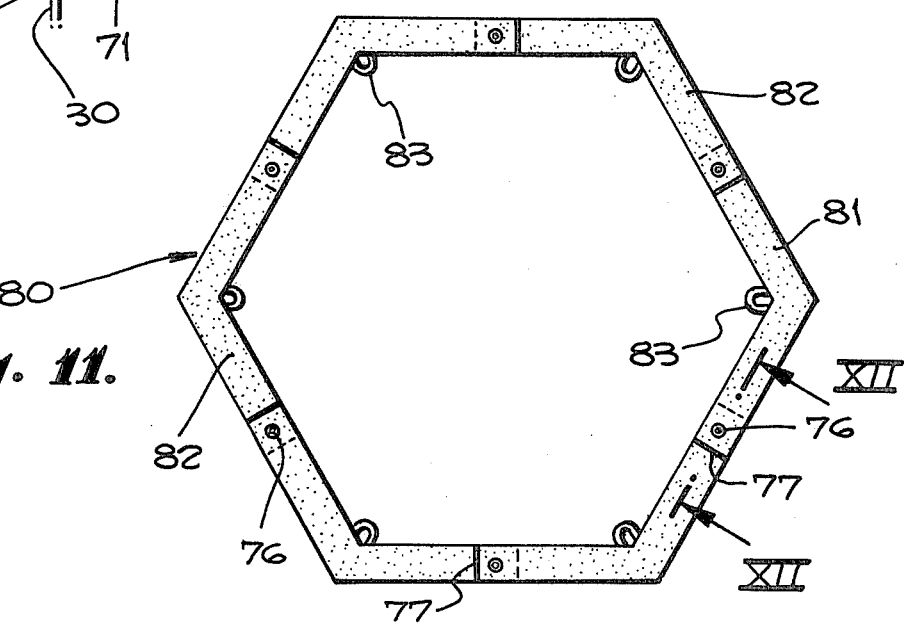

PIPE CONSTRUCTION AND METHOD OF MAKING SAME

BACKGROUND OF INVENTION

One of the proposals for the use of ocean energy contemplates the conversion of such energy into electrical power. Such conversion of ocean energy involves the use of the difference in temperature of ocean water between the water adjacent the surface of the ocean and water near the seabed or at substantial depths, such as 3000 to 6000 feet. At water depths of about 3000 feet, the temperature of ocean was is in the order of 35° F. Adjacent the surface of the ocean, the temperature of the water may be as high as 80° F. It is proposed to utilize this temperature differential of between 40° F. to 50° F. in an ammonia gas cycle for driving a turbine to generate electricity. In order to utilize the temperature differential of the ocean water, it is contemplated that a so-called "cold water pipe" should be suspended from the surface of the water to the selected depth and terminate above the ocean bottom so that a column of water of different temperature gradient is available. It is also contemplated that such a suspended pipe may involve diameters of from 60 to 100 feet and lengths of 3000 feet or more or less. It is apparent that fabricating a pipe of such size by conventional methods would be extremely difficult. Furthermore, handling of pipe sections of such size would be difficult and would require special equipment.

SUMMARY OF INVENTION

The present invention relates to a novel pipe construction and method of assembly which will permit fabrication of a pipe of any selected large diameter, such as 60 to 100 feet and which will permit a pipe of selected length to be made for the above purpose. The invention more particularly relates to a pipe construction made of a plurality of discrete separate pipe elements interconnected and held in assembly by longitudinally extending tension members.

The primary object of the present invention is to provide a novel pipe construction and method of fabricating the same.

An object of the invention is to provide a novel pipe construction adapted to be fabricated and assembled at a selected ocean site.

Another object of the present invention is to provide a pipe construction fabricated and assembled from discrete pipe sections which may be joined to provide a pipe element of generally circular form and which is adapted to support thereon a similarly constructed pipe element.

A further object of the present invention is to provide a novel method of assembling a pipe structure of large diameter and long length at an ocean location.

A more specific object of the present invention is to provide a pipe construction comprising a coaxial stack of discrete annular members supported one upon the other, seal and restraint means between said members, and means for suspending said stack of assembled, sealed, annular members.

Various other objects and advantages of the present invention will be readily apparent from the following description of the drawings in which exemplary embodiments of the invention are shown.

IN THE DRAWINGS

FIG. 1 is a fragmentary, somewhat schematic, sectional view of a moon pool in a vessel illustrating initial assembly of a pipe construction embodying this invention.

FIG. 2 is a view similar to FIG. 1 showing a pipe construction of this invention substantially completed and spaced from the sea floor.

FIG. 3 is a transverse view through the pipe construction shown in FIG. 2, the view being taken in the transverse horizontal plane indicated by line III—III of FIG. 2.

FIG. 8 is a fragmentary enlarged view of a different modification of pipe elements.

FIG. 9 is a fragmentary perspective view of still another modification of different pipe elements of this invention.

FIG. 10 is a fragmentary perspective view of still a further modification of the pipe elements of this invention.

FIG. 11 is an end view of a still further modification of the pipe construction of this invention.

FIG. 12 is an enlarged, fragmentary, sectional view taken in the plane indicated by the line XII—XII of FIG. 11.

In the example of this invention shown in FIG. 1, a floating vessel, fragmentarily shown and generally indicated at 20, includes deck 21 and a moon pool 22 of selected size. The diameter of the moon pool is large enough to accommodate pipe diameters of from 60 to 100 feet. Vessel 20 may be equipped with suitable machinery including derrick rigs, not shown, to facilitate handling of pipe members.

Figure 5:
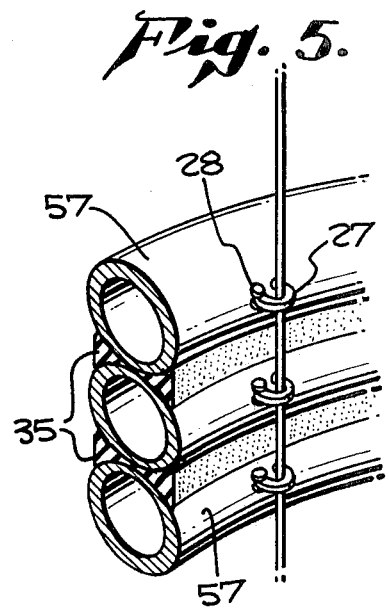
FIG. 5 is a fragmentary enlarged view of a portion of the pipe construction illustrating connection to tension members.

A pipe construction embodying this invention is generally indicated at 25, FIG. 2. Pipe construction 25 includes a plurality of toroidal, hollow pipe elements 26, each pipe element 26 being of circular cross section, hollow, and made of suitable metal material. Around the inner circumference of each element 26 are provided spaced eyelet forming members 27 which may be pivoted at 28 (FIG. 5) to facilitate opening of the eyelet to receive a tension line and closing of the eyelet to retain the tension line therewithin. Latch means to retain the eyelet member 27 in closed position may be provided.

As shown in FIG. 1, a first toroidal pipe element 26 may be suspended in moon pool 22 from tension members 30, such as cable, chain and the like, which are adapted to be supported over suitably mounted sheaves 31 and wound around motor driven winch means 32 on deck 21. Each tension member 30 includes a suitable enlarged end 33 of a size greater than the opening in eyelet member 27 to support pipe element 26.

It should be noted that each pipe element 26 may be hollow and is provided selected buoyancy depending upon its location along the length of the pipe structure.

Between each toroidal pipe element 26 is a seal means 35. Seal means 35 serves as a fluid tight seal between elements 26 and also provides a predetermined resistance to relative horizontal, i.e. shear, movement between successive toroidal elements which may be caused by vessel and wave forces. Seal means 35, FIG. 5, may comprise suitable elastomeric material formed in an annulus of the same diameter as the toroidal pipe elements 26 so that the seal means 35 may extend circumferentially between adjacent superposed pipe elements 26 and provides a smooth internal surface to reduce friction. Seal means 35 may be bonded to the pipe by suitable adhesive means and, as will be apparent from FIG. 2, will be placed under some compression as the pipe structure is assembled and completed.

In FIG. 8, a somewhat different form of seal and restraint means 35' is shown in which the inner circumferential portion 36 of the seal means 35' is enlarged and provided with an inner cylindrical surface 37.

In another modification of seal means 35, the upper circumferential surface of pipe element 26' is provided with spaced ribs 40 defining a circular groove 41 which receives a downwardly directed circumferential rib 42 on the bottom surface of element 26' for reception within groove 41. Suitable angle or U section sealing means 35" occupy the space between the ribs 40 and 42 to effect a tight watertight seal.

In the example shown in FIGS. 1 and 2, a plurality of toroidal pipe elements 26 are successively stacked one upon the other in order to provide a water-tight pipe structure which may extend as much as 3000 to 4000 feet into the sea. It is understood that the inner portion of the pipe contains sea water and that collapse of the pipe because of ambient water pressure at the depths to which the pipe extends is avoided thereby.

Figure 6:
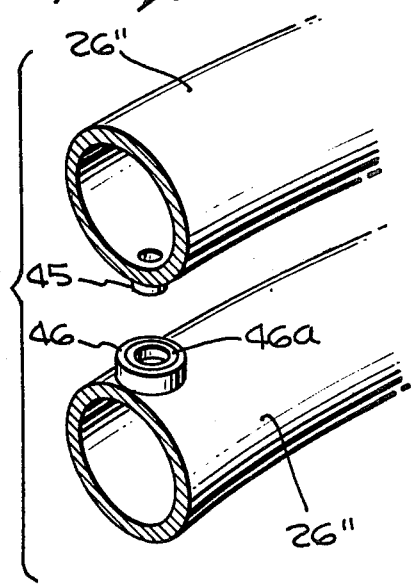
FIG. 6 is an exploded, fragmentary view of two adjacent members forming part of the pipe construction of this invention and illustrating a modification thereof.

In FIG. 6, a further modification of pipe elements 26 is shown in that pipe elements 26" may be provided with cooperable nipple fitting 45 and socket fitting 46 for communication between the interior chambers of the pipe elements 26", in order to provide selective ballasting of certain sections of the pipe structure. A resilient sleeve bushing 46a may be received in socket fitting 46. Fittings 45 and 46, when the pipe elements are assembled, also serve to restrict relative arcuate and lateral movement of one pipe element with respect to the other.

Since the handling of large toroidal pipe elements of from 60 to 100 feet in diameter requires special equipment and is awkward, the present invention contemplates a pipe structure of the form shown in FIGS. 1 and 2 but in which each toroidal pipe element 56, FIG. 3, is formed of a suitable number of arcuate pipe sections 57. In this example, four arcuate pipe sections 57 are shown, and depending upon the diameter of the pipe element 56, four or more pipe sections 57 may be utilized.

Figure 4:
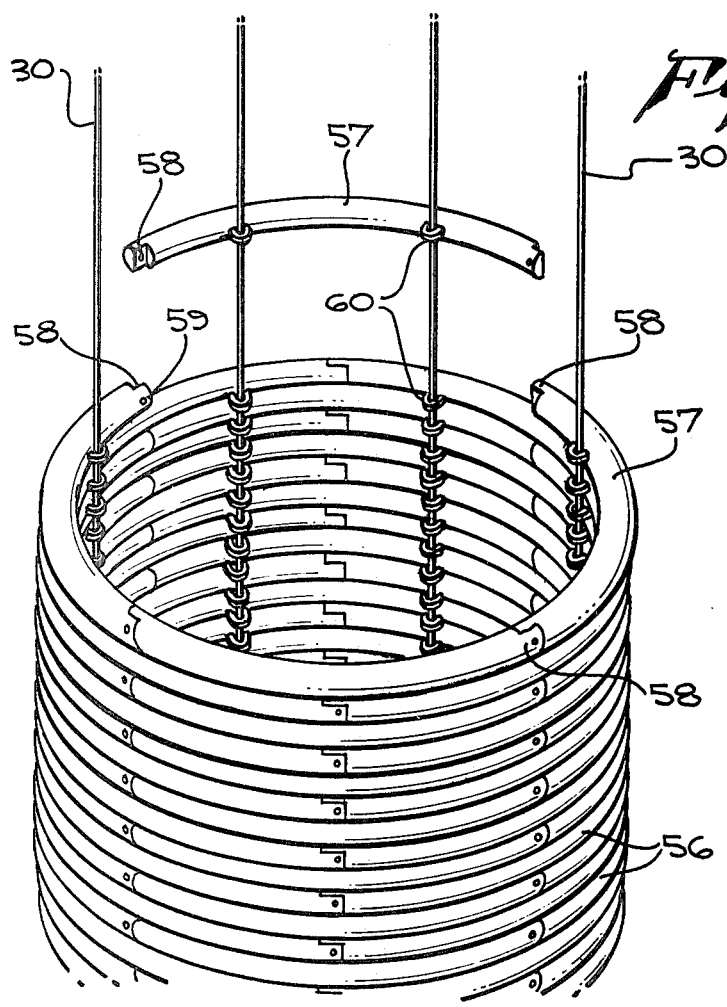
FIG. 4 is a perspective fragmentary view illustrating another step in assembly of the pipe construction shown in FIGS. 1 and 2.

A pipe structure utilizing arcuate pipe sections 57 is shown in FIG. 4. Each pipe section 57 includes an arc of selected length and is provided with end connectors 58 adapted to overlap and to be secured together by suitable pins or nut and bolt assemblies, generally indicated at 59. Each arcuate section 57 also includes eyelet members 60 spaced along the inner circumference of the arcuate section 57 and of the same or similar type as eyelet 27 of the prior embodiment of the invention.

Arcuate segments 57 are readily handled and each toroidal pipe element 56 may be assembled by placing arcuate sections in proper relation to the tension members 30, enclosing the tension members within the eyelets 60 and then interconnecting the adjacent sections 57 therewith until the pipe element 56 is formed. Seal means, such as those described above, may then be placed on top of the pipe element 56 and the next pipe element 56 may be assembled on top of the seal means in similar manner as that just described. As shown in FIG. 4, the connector elements 58 may be preferably staggered from one course of pipe sections 57 to the next assembled course of pipe sections 57 so that the joints therebetween will not lie in the same vertical line. As illustrated, the joint lines are in vertical alignment for alternate pipe elements 56; however, they may be offset circumferentially in any suitable manner.

Figure 7:
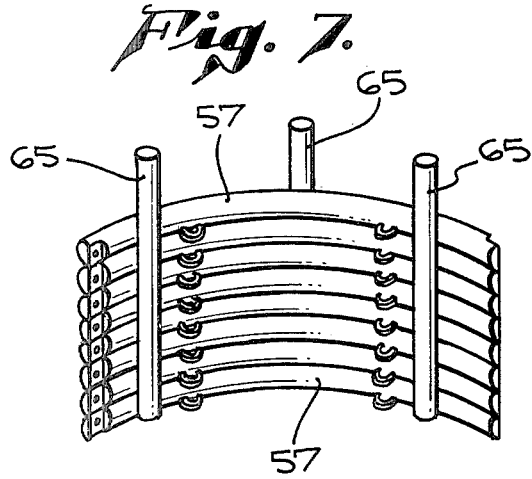
FIG. 7 is a perspective view illustrating stacking of arcuate segments of pipe elements forming the pipe construction of this invention.

FIG. 7 illustrates an exemplary way of stacking and storing pipe sections 57 on the deck of a vessel. Sections 57 may be readily held against lateral movement by three upstanding posts 65, two of which may bear against the inner circumference of pipe sections 57 and the other may bear against the central outer circumferential portion of pipe sections 57. It will be understood that pipe sections 57 may thus be readily handled, stored and assembled.

Another embodiment of the present invention is shown in FIGS. 10-12. In FIG. 10, pipe sections 70 may be of arcuate form and may require a selected number of sections 70 to form a circular pipe element, such as 26 of the prior embodiment. Each pipe section 70 may be cast of lightweight concrete and of suitable cross sectional shape, in this example, illustrated as rectangular. Each section 70 includes eyelets 71 similar in form to eyelets 27. Between adjacent pipe section 70 is provided an elastomeric or other suitable seal means 72 so that the wall of the pipe structure formed by such pipe sections will be leakproof. FIG. 10 does not illustrate end connectors between pipe section 70; however, such end connections may be of the type illustrated in FIG. 12 wherein overlapping portions 74 and 75 are secured together by suitable nut and bolt assemblies 76. Such a joint is provided with seal means 77.

While the prior examples of the invention have illustrated pipe structures of cylindrical form, it will be understood that the cross sectional shape of a pipe may be any selected polygonal shape. In FIG. 11, a hexagonal cross sectional pipe shape is illustrated. Such pipe construction, generally indicated at 80, may include a hexagonal pipe element 81 formed of a course of pipe sections 82 of angular shape. Pipe sections 82 may be cast of lightweight concrete and may include eyelets 83 located at the vertex of the angular section. Each pipe section 82 may be connected to the adjacent pipe section 82 by an overlapping end construction as described in FIG. 12.

The pipe structure contemplated by this invention and as described above thus comprises the forming of a coaxial stack of discrete pipe elements with seal and restraint means between the elements to provide a leakproof pipe wall. The coaxial stack is made around a plurality of internal tension members and each pipe section is secured with respect to said tension member against lateral movement. While the tension members are illustrated as wire cable, other types of tension members may be used, such as chain or pipe.

The pipe structure of this invention is thus readily adapted to be made of any selected diameter and of any length for use in a selected water depth. Assembly of the pipe structure by superposing pipe element upon pipe element facilitates construction of a pipe in which physical characteristics of a pipe portion may be readily modified to provide optimum construction and performance at selected depths.

Various changes and modifications may be made in the pipe structure described above which come within the spirit of the invention, and all such changes coming within the scope of the appended claims are embraced thereby.

I claim:

1. A pipe construction comprising:
   a plurality of annular elements of selected cross section stacked one upon the other in coaxial relation to form an open ended passageway;
   sealing means between each of said elements;
   means for suspending said stack of elements including a plurality of tension members, each fixed to the bottommost of said elements,
   each of said tension members having a guiding connection to each of said elements;
   said elements in stacked relation being under compression, said tension members being under tension;
   each annular element including a plurality of arcuate sections.

2. A pipe construction as stated in claim 1 wherein said annular elements include tubular sections and form a torus.

3. In an open ended pipe construction of large diameter and progressively assembled elements to provide a selected length, the combination of:
   a plurality of annular elements in stacked relation to provide a passageway;
   tension means extending along said passageway;
   means fixedly connecting one end of said tension means to one end annular element;
   means guidably connecting said tension means to intermediate and the other end annular element whereby in vertical position said annular elements rest one upon the other;
   and means restraining relative lateral movement between said annular elements;
   each annular element including a plurality of arcuate sections,
   and means interconnecting said arcuate sections.

4. A construction as stated in claim 3 wherein said restraining means includes sealing means between said annular elements,
   and sealing means at said means interconnecting said arcuate sections.

5. A pipe construction for deep sea operations comprising:
   a stack of coaxial annular members arranged in courses resting one upon the other,
   each course including one or more annular elements interconnected at ends thereof,
   the annular member of each course having a face juxtaposed to the face of an adjacent course;
   seal means between said faces of adjacent courses to provide a nonleaking pipe wall;
   and tension members fixedly connected to one of the end annular members and guidably connected to the intermediate and other end member for maintaining assembly of the stack of annular members.

6. In a pipe construction for deep sea operations as stated in claim 5 wherein said annular members include hollow annular members, certain of said hollow members including ballast material for stabilizing the pipe construction.

7. In a pipe construction as stated in claim 5 including means on annular members of each course for interlocking engagement with means on annular members of an adjacent course.

8. A pipe construction as stated in claim 5 wherein said annular members are made of concrete having a polygonal cross section.

9. A pipe construction as stated in claim 5 wherein said annular members include arcuate sections of concrete;
   and overlapping joint means interconnecting adjacent ends of the arcuate sections;
   seal means between said overlapping joint means;
   and fastening means for said joint means to maintain said arcuate sections in assembly.

10. A pipe construction comprising:
    a plurality of annular elements of selected cross-section stacked one upon the other in coaxial relation to form an open-ended passageway;
    sealing means between each of said elements;
    means for suspending said stack of elements including a plurality of tension members, each fixed to the bottommost of said elements,
    each of said tension members having a guiding connection to each of said elements by guiding connection means;
    said elements in stacked relation being under compression, said tension members being under tension;
    each of said annular elements including arcuate sections of lightweight concrete.

11. A pipe construction comprising:
    a plurality of annular elements of selected cross-section stacked one upon the other in coaxial relation to form an open-ended passageway;
    sealing means between each of said elements;
    means for suspending said stack of elements including a plurality of tension members, each fixed to the bottommost of said elements,
    each of said tension members having a guiding connection to each of said elements by guiding connection means;
    said elements in stacked relation being under compression, said tension members being under tension;
    said sealing means including an annular elastomeric material having an enlarged cylindrical surface interiorly of said passageway and compressed between adjacent elements.

12. In a method of fabricating a pipe structure of large diameter and long length comprising the steps of:
    providing a plurality of tension members arranged at a selected radius from the axis of the pipe structure to be formed;
    attaching arcuate sections to said tension members and interconnecting adjacent sections to provide a course of sections providing an annular element encircling said axis;
    placing an annular seal means on said annular elements;
    assembling a second course of sections on top of said seal means while attaching said second sections to said tension members and interconnecting said sections to form a second annular element;
    continuing to form such elements one on top of the other until a selected length is provided.

13. In a method as stated in claim 12 including the steps of:
    restraining lateral movement of the annular elements relative to each other.

* * * * *